United States Patent [19]
Tsatsis

[11] Patent Number: 6,054,838
[45] Date of Patent: Apr. 25, 2000

[54] PRESSURIZED ELECTRIC CHARGING

[76] Inventor: Constantinos Tsatsis, 607 Salem St., Lynnfied, Mass. 01940

[21] Appl. No.: 09/120,478

[22] Filed: Jul. 23, 1998

[51] Int. Cl.$^7$ ................ H02J 7/00; B60K 1/00; F03D 9/00

[52] U.S. Cl. ............ 320/101; 290/55; 180/165; 180/65.3

[58] Field of Search ............ 320/101; 290/52, 290/55; 180/165, 65.3

[56] References Cited

U.S. PATENT DOCUMENTS

| | | | |
|---|---|---|---|
| 3,880,250 | 4/1975 | Emanuele | 180/65 R |
| 4,229,661 | 10/1980 | Mead et al. | 290/44 |
| 4,311,917 | 1/1982 | Hencey, Jr. et al. | 290/1 |
| 5,280,827 | 1/1994 | Taylor et al. | 180/165 |
| 5,680,032 | 10/1997 | Pena | 290/52 |

*Primary Examiner*—Peter S. Wong
*Assistant Examiner*—Gregory J. Toatley, Jr.
*Attorney, Agent, or Firm*—G. E. Kersey

[57] ABSTRACT

Method and apparatus for electrical storage and pressure charging, by compressed fluid through a venturi, the electrical storage, where the electrical storage can take the form of a battery for operating a motor vehicle and electrical charges are produced by a generator operated by a turbine connected to a pressure storage tank operated when the storage charge falls below a prescribed level; in the method, stored compressed fluid operates a generator for charging the electrical storage.

19 Claims, 3 Drawing Sheets

PRESSURIZED ELECTRIC CHARGING

BACKGROUND OF THE INVENTION

This invention relates to electric charging and, more particularly, to the charging of electric storage devices.

A typical electric storage device is a battery that can be installed in a vehicle. The usual battery vehicle is used only for starting and lighting, after the vehicle has been started, typically using an internal combustion engine, because the electrical energy stored in the battery is insufficient to operate the vehicle.

The internal combustion engine is a significant source of air pollution and attempts have been made to provide an alternative source to power vehicles. Solar panels at present require such a large charging surface that they are largely unsuitable. Electric cars that use the ordinary recharge systems have a limited range of operation and then require return to an electric charging station.

Accordingly, it is an object of the invention to overcome the the problems of the prior art.

SUMMARY OF THE INVENTION

In accomplishing the foregoing and related objects, the invention provides apparatus for storing electrical energy and pressure charging the electrical storage means.

In accordance with one aspect of the invention the electrical storage means comprises a battery which is installable in a vehicle.

In accordance with another aspect of the invention the pressure means comprises means for storing compressed fluid, which can be gaseous, and the pressure means includes means for generating electrical charges by a pressure storage tank connected to a turbine which is connected to a generator.

The charge on said electrical storage means is monitored and said means for generating electrical charges is operated when said charge on said electrical storage means falls below a prescribed level. The operation of said means for generating electrical energy is terminated when said charge on said electrical storage means returns to said prescribed level.

In a method of the invention for electrical charging the steps comprise storing electrical energy and pressure charging the electrical storage means.

In accordance with one aspect of the method the storing of the electrical energy is in a battery which is installed in a vehicle. The storing of compressed fluid is in said pressure means, and the compressed fluid is gaseous. The d pressure means includes means for generating electrical charges and the means for generating electrical charges comprises a pressure storage tank connected to a turbine which is connected to a generator.

The charge on said electrical storage means is monitored and said means for generating electrical charges is operated when said charge on said electrical storage means falls below a prescribed level. The operation of said means for generating electrical energy is terminated when said charge on said electrical storage means returns to said prescribed level.

In a method of the invention for fabricating electrical charging apparatus the steps include (a) providing means for storing electrical energy; and (b) providing means for pressure charging the electrical storage means.

For one aspect of the method said electrical storage means comprises a battery installed in a vehicle, said pressure means comprises means for storing a compressed gaseous fluid and includes means for generating electrical charges from a pressure storage tank connected to a turbine which is connected to a generator, and the charge on said electrical storage means is monitored to operate when said charge on said electrical storage means falls below a prescribed level, and the operation of said means for generating electrical energy is terminated when said charge on said electrical storage means returns to said prescribed level.

DESCRIPTION OF THE DRAWINGS

Other aspects of the invention will become apparent after considering several illustrative embodiments taken in conjunction with the drawings in which.

DETAILED DESCRIPTION

Figure 1:
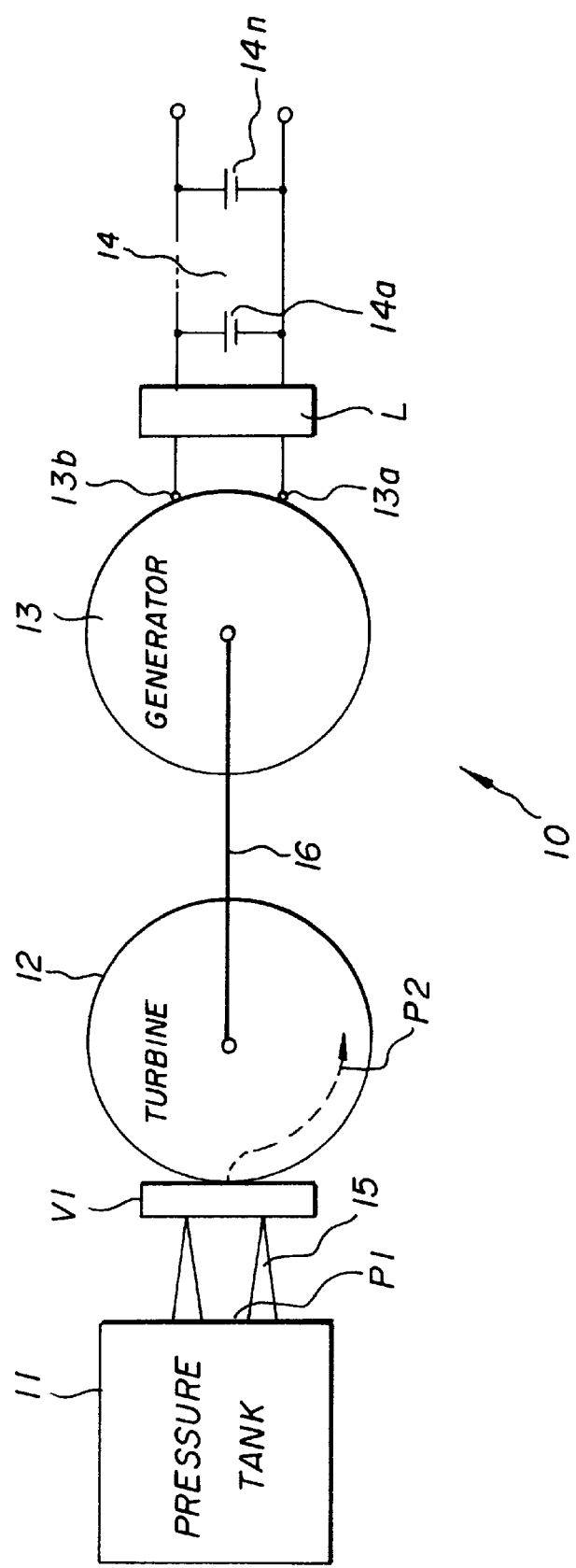
FIG. 1 is a block diagram of a pressurized electric charging system in accordance with the invention.

With reference to the drawings, the block diagram of FIG. 1 outlines the primary components of a pressurized electric charging system 10 of the invention, which includes a pressure tank 11, a turbine 12, a generator 13, and an array 14 of batteries.

Interconnecting the pressure tank 11 and the turbine 12 is a venturi nozzle 15 which serves to raise the pressure that is released from the tank 11 at an appropriate time interval as explained below.

When pressure P1 from the tank 11 is released through the venturi 15, and enters the turbine 12, the rotation of the turbine 12, because of the gas pressure P2 on its interior blades (not visible in FIG. 1), causes the rotation of the generator 13 by virtue of the coupling 16 of the respective shafts of the turbine 12 and the generator 13.

This produces a voltage across the terminals 13a and 13b of the generator 13. It will be understood that both the turbine 12 and the generator 13 are each of conventional construction In FIG. 1, the voltage produced by the generator 13 is applied to the bank 14 of batteries 14a–14n. Accordingly, the generator 13 produces a Direct Current (DC) output. For that purpose the generator 13 may have a conventional magnetized rotor and a conventional stator winding which can supply additional magnetization to the rotor windings. The output is taken from the stator in conventional fashion.

It will be understood that other types of DC generator may be employed and that the generator 13 may produce Alternating Current (AC), as well as other forms of output.

Accordingly, when the venturi 15 is operated, for example by opening the control valve V1, a voltage appears across the terminals 13a and 13b. It is convenient to use this generated voltage to charge the batteries of the bank 14, made up of individual parallel cells 14a–14n. In order to prevent the batteries from being overcharged, the lead 13a and 13b are connected to a voltage limiter L.

For the conventional lead-acid battery in common use, normal voltage is 6 or 12 Direct Current volts. The charging voltage normally exceeds the nominal battery voltage, so that the generator 13 is limited to a voltage on the order of 7 or 14 volts, respectively.

When the battery array 14 is fully charged, the venturi outlet valve V1 is closed so that the charging voltage from the generator 13 is removed from the storage battery array 14. Once the batteries of the array 14 are fully charged, they can be used to supply direct current energy in conventional fashion.

Figure 2:
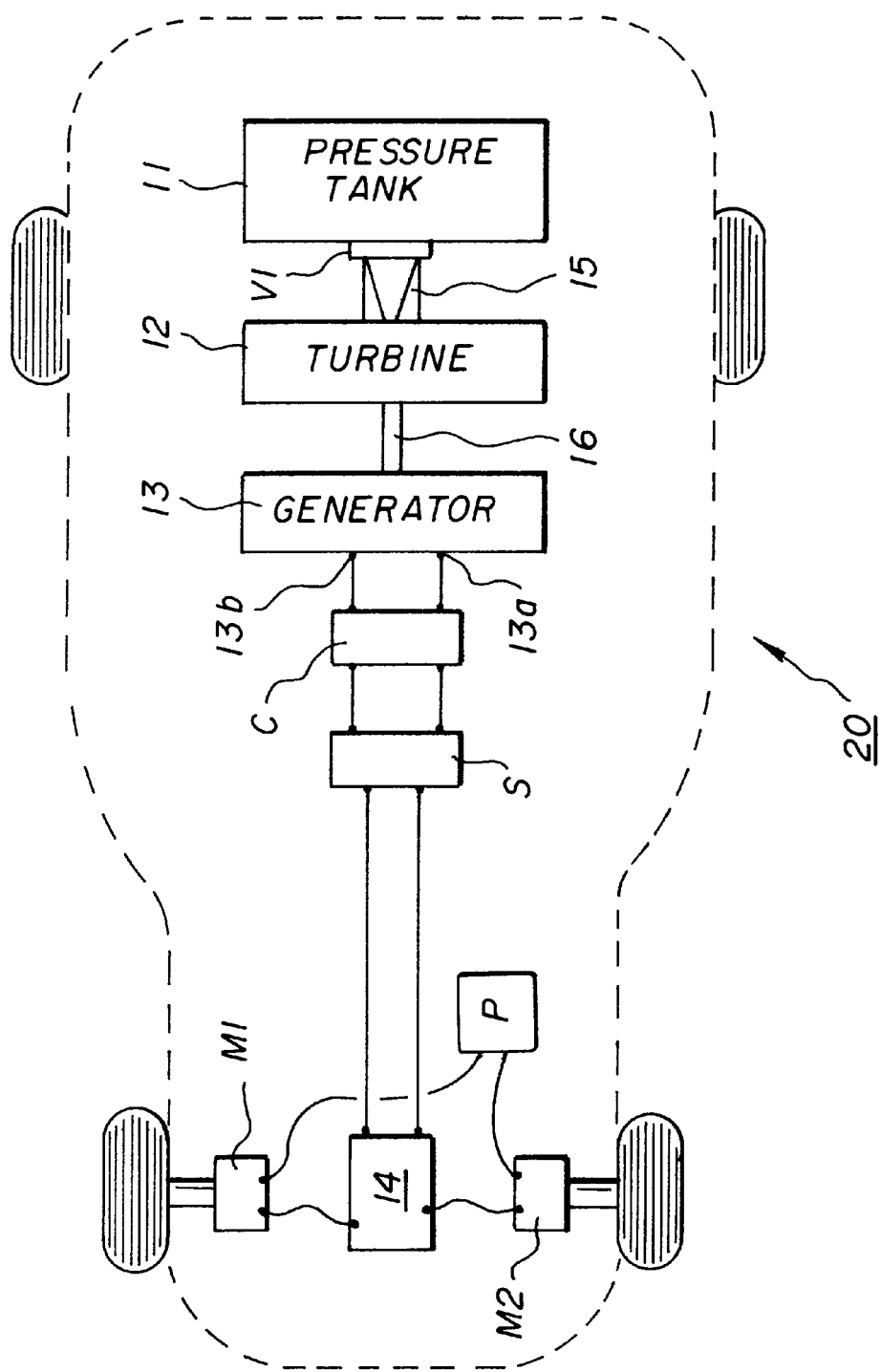
FIG. 2 is a schematic diagram showing the invention adapted for use in an electric vehicle.

One adaptation of the invention is illustrated in FIG. 2 where the system 10 of FIG. 1 is used in a vehicle 20, shown in dashed outline. The battery bank 14 of FIG. 1 becomes the storage battery assemblage 14 of the vehicle 20, and is used to supply Direct Current to motors M1 and M2 through a control panel P. The motors M1 and M2 provide front-wheel drive through respective axles connected to the front tires of the vehicle 20. The turbine 12 and generator 13 take the place of a conventional engine.

Instead of having a fuel tank, or a bank of solar cells, the vehicle 20 includes the pressure tank 11 of the invention.

It is readily apparent that when the system 10 of the invention is used in a device, such as the vehicle 20, it provides definite advantages over other electrical systems, such as those provided by batteries required to be charged at an external charging source. In the case of the invention, the vehicle 20 carries with it a pressure tank source 11 for recharging its battery assemblage 14.

Thus, when the voltage level of the battery assemblage 14 in the vehicle 20 drops below a prescribed level, the energy stored in the pressure tank 11 can be used to bring the voltage of the battery assemblage 14 back to a desired level. Consequently, a driver does not need to be concerned when the voltage of his battery assemblage 14 falls to a level which, in the case of a conventional electric vehicle, requires a return to an external charging station. In the case of the invention, all that is needed is to release the pressure stored in the pressure storage tank 11 to operate the turbine 12 and the generator 13 to provide a suitable level of charge on the battery assemblage 14.

The recharging can be accomplished manually, or automatically. For manual operation a sensor in the control panel P monitors the battery assemblage voltage and indicates when recharging is needed. The operator can then open the valve V1 until the desired level of charge is attained. Operation of the valve V1 can be by solenoid action.

For automatic operation standard sensors, e.g. sensor S, are employed with the valve V1 and a comparator C which compares the voltage of the generator 13 with the voltage of the battery bank 14. When the comparator C senses that the battery voltage is less than needed, it opens the valve V1.

The turbine 12 is used in conjunction with the generator 13 to produce electrical power. Fluid power for the turbine 12 can be provided by a compressor system during those periods when the output generator level falls below a prescribed value.

Figure 3:
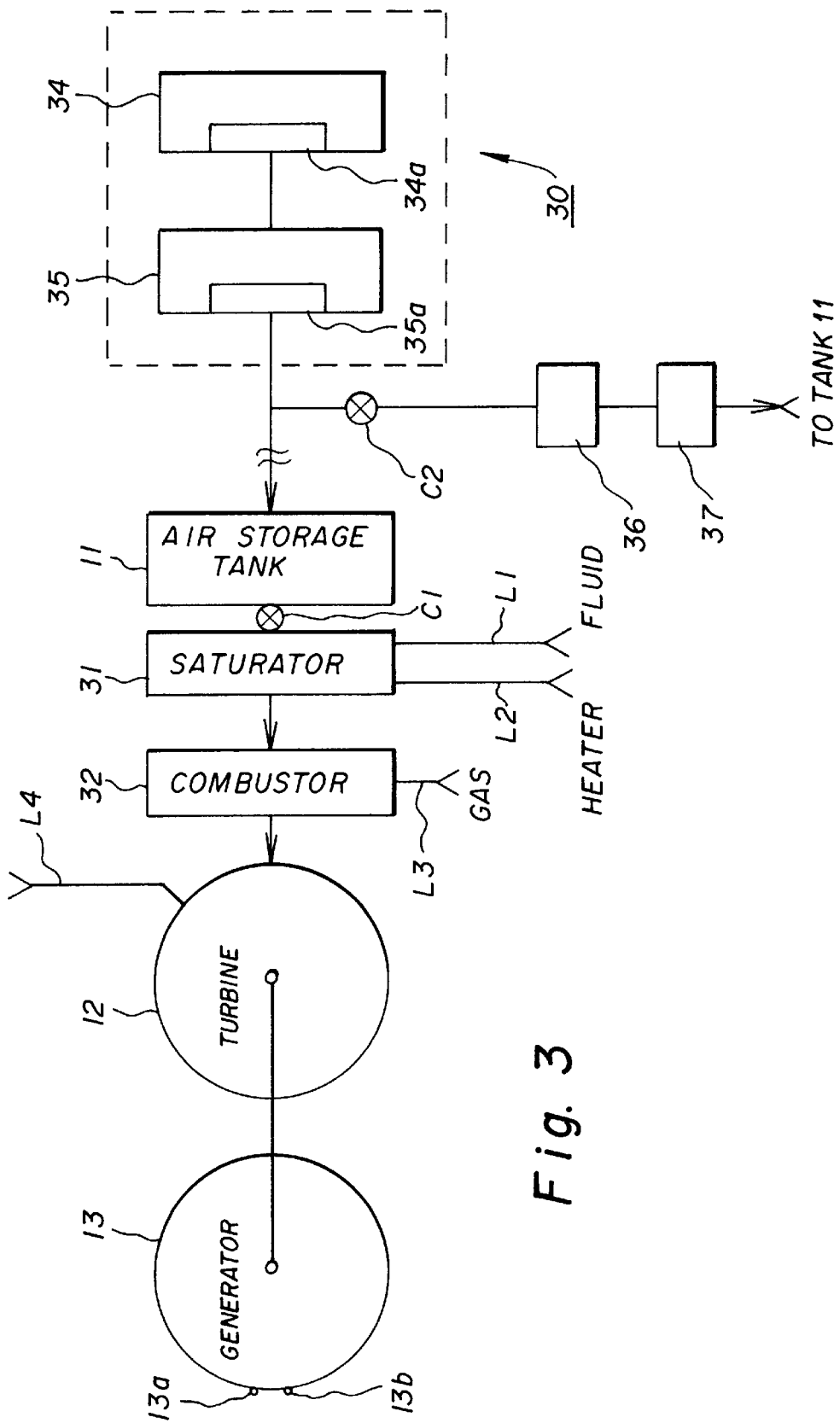
FIG. 3 is a schematic diagram of a further alternative embodiment of the invention.

As indicated in FIG. 3, a separate compressor system 30 can be used to store fluid, such as air, in the pressure storage tank or chamber 11. The compressed fluid from the tank 11 is used during those intervals when the battery level is to be returned to its desired value. When the tank 11 is being pressurized, it can be disconnected from the turbine by operation of a control valve C1.

To pressurize the tank 11, the compressor system 30 includes a low-pressure compressor 34 and a high-pressure compressor 35. Preferably the low pressure compressor 34 is coupled to an inter-cooler 34a to remove some of the thermal energy of compression. The continuous output of the high-pressure compressor 35 is preferably coupled to an after-cooler 35a which removes additional thermal energy from the resultant continuously compressed air stream. The thermal energy thus removed can be applied to a saturator.

The resultant compressed air can flow directly to the tank 11, or, after opening of a control valve C2, can flow continuously and directly from the compressor system to a saturator 36 before being applied to a combustor 37. The saturator 36 is more effective if used in conjunction with an after-cooler, which does not remove excessive thermal energy from the compressed air stream that exits the compressor system 30.

The compressed air stream produced by the compressor system 30 contains both mechanical and thermal energy. When processed through an after-cooler, much of the thermal energy is withdrawn. This is required so that the compressed air will be cold enough to be compatible with a practical air storage tank. The air stream thus cooled is conveyed to the tank 11 to store the mechanical energy of the compressed air.

This mechanically stored energy is used when the compressor system 30 is shut down and the voltage level of the battery bank 14 is insufficient. This energy may be used in conjunction with fuel fed to the turbine through the combustor by line L3, or directly by line L4. More specifically, compressed air from the storage tank 11 can be conveyed to a combuster, such as the combustor 32, through an appropriate configuration of valves.

To enhance the efficiency of the system, a saturator 31 can be positioned between the storage tank 11 and a combustor 32, which can provide hot gas for driving the turbine 12. The saturator 31 receives compressed air from the storage tank 11 and simultaneously heats and humidifies it. Fluid for humidification can be supplied over line L1, and heater current can be applied over line L2, from the battery assemblage 14 of FIG. 1, or other source. The resulting heated and humidified compressed air is conveyed to the combuster 32.

Power production by the turbine 12 is enhanced by the combination of air storage and saturation, i.e. humidification and post-storage heating. This combination yields a number of advantages. It enables the continuous operation of a battery system, such as the assemblage 14 of FIGS. 1 and 2.

By conveying a pressurized air steam from the storage tank 11 to the saturator 31, the turbine 12 can receive a heated and humidified gaseous stream with greater mass flow and greater thermal energy. This provides the saturator with a reduced amount of needed energy and thus a reduction in any required fuel. Consequently, the invention can reduce undesirable emissions.

A specific embodiment of an enhanced system in accordance with the invention contains a combination of air storage, fuel processing and "saturation" by simultaneous heating and humidification of air.

A motor (not shown) drives the compressor system 30. The thermal energy of the compressed air stream is removed by heating water in an inter-cooler and after-cooler, and the heated water can be conveyed to a hot water storage tank.

Cooling may also be provided to reduce some of the water temperature in the inter-cooler and in the after-cooler. Some of the compressed air stream produced by the system 30 can be conveyed directly through an open valve to the tank 11, while the remainder can go directly to the saturator 36 through an open valve C2.

The system is preferably sized to compress more air while "on" than is consumed by the turbine 12. Over time, the air storage and withdrawal can remain in balance. Thus, the air storage tank 11 serves to conserve the mechanical energy of compressed air, and the thermal energy not removed by an aftercooler. A hot water tank can store much of the energy of compression. These sources of energy may be used in accordance with the invention with the mechanical energy used at time periods when it is necessary to recharge the battery bank 14.

While preferred embodiments have been shown and described, it is to be understood that changes in details of construction and method from what has been illustrated may be made without departing from the spirit and scope of the invention as defined by the appended claims.

What is claimed:

1. Apparatus comprising means for storing electrical energy; and pressure means for charging the electrical storage means through a venturi;

wherein said pressure means comprises means for storing compressed fluid.

2. Apparatus as defined in claim 1 wherein said electrical storage means comprises a battery for operating a motor vehicle.

3. Apparatus as defined in claim 2 wherein said battery is installed to supply motive power for a vehicle.

4. Apparatus as defined in claim 1 wherein said compressed fluid is air is produced by a compressor system.

5. Apparatus as defined in claim 4 wherein said pressure means includes means for generating electrical charges and said compressor system includes a low-pressure compressor and a high-pressure compressor.

6. Apparatus as defined in claim 5 wherein said means for generating electrical charges comprises a pressure storage tank connected to a turbine which is connected to a generator and said low pressure compressor is connected to an inter-cooler.

7. Apparatus as defined in claim 6 wherein the charge on said electrical storage means in monitored and said means for generating electrical charges is operated when said charge on said electrical storage means falls below a prescribed level and said high pressure compressor is connected to an after-cooler.

8. Apparatus as defined in claim 7 wherein the operation of said means for generating electrical energy is terminated when said charge on said electrical storage means returns to said prescribed level and said compressor system includes a saturator and a combustor.

9. A method of electrical charging comprising storing electrical energy in electrical storage means; and venturi charging said electrical storage means by means for storing compressed fluid.

10. The method of claim 9 including storing electrical energy in a battery.

11. The method of claim 10 including installing said battery in a vehicle to supply motive power therefor.

12. The method of claim 9 including storing compressed air in said pressure means.

13. The method of claim 9 wherein said compressed fluid originates in a low-pressure compressor.

14. The method of claim 13 wherein said pressure means includes means for generating alternating current electrical charges.

15. The method of claim 14 wherein said means for generating electrical charges comprises a pressure storage tank connected to a turbine which is connected to a generator having a conventional magnetized rotor and a conventional stator winding which supplies additional magnetization to the rotor windings.

16. The method of claim 15 wherein the charge on said electrical storage means is monitored and said means for generating electrical charges is operated when said charge on said electrical storage means falls below a prescribed level.

17. The method of claim 16 wherein the operation of said means for generating electrical energy is terminated when said charge on said electrical storage means returns to said prescribed level.

18. A method of fabricating electrical charging apparatus comprising the steps of:

(a) providing means for storing electrical energy; and (b) providing means for pressure charging the electrical storage means through a venturi by a compressed gaseous fluid.

19. The method of claim 18 wherein said electrical storage means comprises a battery for moving a vehicle, said pressure means comprises means for storing a compressed gaseous fluid and includes means for generating electrical charges from a pressure storage tank connected to a turbine which is connected to a generator, and the charge on said electrical storage means is monitored to operate when said charge on said electrical storage means falls below a prescribed level, and the operation of said means for generating electrical energy is terminated when said charge on said electrical storage means returns to said prescribed level.

* * * * *